US008457546B2

(12) United States Patent
Mahajan et al.

(10) Patent No.: US 8,457,546 B2
(45) Date of Patent: Jun. 4, 2013

(54) INTERACTIVE WIFI CONNECTIVITY FOR MOVING VEHICLES

(75) Inventors: Ratul Mahajan, Seattle, WA (US); Aruna Balasubramanian, Belchertown, MA (US)

(73) Assignee: Microsoft Corporation, Redmond, WA (US)

( * ) Notice: Subject to any disclaimer, the term of this patent is extended or adjusted under 35 U.S.C. 154(b) by 1194 days.

(21) Appl. No.: 12/178,410

(22) Filed: Jul. 23, 2008

(65) Prior Publication Data
US 2010/0020774 A1 Jan. 28, 2010

(51) Int. Cl.
*H04B 3/36* (2006.01)
*H04B 7/14* (2006.01)

(52) U.S. Cl.
USPC ............. 455/7; 455/11.1; 455/16; 455/345; 370/315; 370/338

(58) Field of Classification Search
USPC ....... 455/7, 11.1, 16, 436, 438, 345; 370/315, 370/328, 338
See application file for complete search history.

(56) References Cited

U.S. PATENT DOCUMENTS

| 5,987,011 | A * | 11/1999 | Toh ............................. 370/331 |
| 7,123,164 | B2 | 10/2006 | Zoladek et al. |
| 7,212,821 | B2 | 5/2007 | Laroia et |
| 7,463,890 | B2 * | 12/2008 | Herz et al. ................... 455/445 |
| 2004/0058678 | A1 | 3/2004 | deTorbal |
| 2005/0215200 | A1 | 9/2005 | Oesterling |
| 2006/0199612 | A1 | 9/2006 | Beyer et al. |
| 2007/0135150 | A1 | 6/2007 | Ushiki et al. |
| 2008/0037493 | A1 | 2/2008 | Morton |
| 2008/0039148 | A1 | 2/2008 | Rudolf |
| 2008/0108367 | A1 | 5/2008 | Afrashteh et al. |
| 2009/0141666 | A1 * | 6/2009 | Jin et al. ...................... 370/315 |
| 2010/0128653 | A1 * | 5/2010 | Tateson ....................... 370/315 |
| 2011/0019651 | A1 * | 1/2011 | Fulknier et al. ............. 370/338 |
| 2011/0122806 | A1 * | 5/2011 | Huang et al. ................ 370/315 |
| 2011/0164562 | A1 * | 7/2011 | Qiu et al. .................... 370/328 |

OTHER PUBLICATIONS

Mobile Satellite for Moving Vehicles, Dec. 5, 2006. http://www.telecomasia.net/article.php?id_article=3010. Last accessed May 9, 2008, 2 pages.
Burns, et al. MORA Routing and Capacity Building in Disruption-Tolerant Networks http://prisms.cs.umass.edu/brian/pubs/bburns.adhoc_nets_jrnl.pdf. Last accessed May 16, 2008, 16 pages.

(Continued)

*Primary Examiner* — Sujatha Sharma
(74) *Attorney, Agent, or Firm* — Lee & Hayes, PLLC

(57) ABSTRACT

Systems and methods are provided to enable high-performance Internet access on board moving vehicles using WiFi data communication protocols. In an illustrative implementation, an exemplary wireless data communications environment comprises a ViFi module, an instruction set comprising at least one instruction set to process data for wireless communication between a cooperating component onboard a moving vehicle and other cooperating wireless components, and one or more wide-area wireless communications links. In an illustrative operation, the ViFi module can perform one or more wireless communications techniques to exploit macro-diversity and opportunistic receptions by cooperating WiFi base stations to minimize disruptions for mobile clients. The exemplary ViFi module can communicate data to and from one or more cooperating WiFI base stations such that the one or more base stations can operatively opportunistically over-hear a packet, and can probabilistically relay the packet to the intended next hop.

20 Claims, 8 Drawing Sheets

OTHER PUBLICATIONS

Aguayo, et al. Link-level Measurements from an 802.11b Mesh Network. In : SIGCOMM'04, Aug.30-Sep.3, 2004, Portland, Oregon, USA. ACM 1-58113-862-8/04/0008. http://pdos.csail.mit.edu/~rtm/papers/p442-aguayo.pdf. Last accessed May 9, 2008, 11 pages.

Amir, et al. Fast Handoff for Seamless Wireless Mesh Networks. In : MobiSys'06, Jun. 19-22, 2006, Uppsala, Sweden. ACM 1•59593•195•3/06/0006. http://www.cnds.jhu.edu/pub/papers/handoff_mobisys06.pdf. Last accessed May 9, 2008, 13 pages.

Balasubramanian, et al. Web Search from a Bus. In : CHANTS'07, Sep. 14, 2007, Montréal, Québec, Canada. ACM 978-1-59593-737-7/07/0009. http://chants.cs.ucsb.edu/2007/papers/3-2.pdf. Last accessed May 9, 2008, 8 pages.

Biswas, et al. EXOR: Opportunistic Multi-Hop Routing for Wireless Networks. In : SIGCOMM'05, Aug. 21-26, 2005, Philadelphia, Pennsylvania, USA. ACM 1595930094/05/0008. http://pdos.csail.mit.edu/papers/roofnet:exor-sigcomm05/roofnet_exor-sigcomm05.pdf. Last accessed May 9, 2008, 11 pages.

Brik, et al. Eliminating Handoff Latencies in 802.11 WLANS using Multiple Radios: Applications, Experience, and Evaluation. http://www.imconf.net/imc-2005/papers/imc05efiles/brik/brik.pdf. Last accessed May 9, 2008, 6 pages.

Btfon. http://www.btfon.com/. Last accessed May 9, 2008, 3 pages.

Bychkovsky, et al. A Measurement Study of Vehicular Internet Access Using Unplanned 802.11 Networks. In : MobiCom'06, Sep. 24-29, 2006, Los Angeles, California, USA. ACM 1595932860/06/0009. http://db.csail.mit.edu/pubs/mobicom06.pdf. Last accessed May 9, 2008, 12 pages.

Chachulski, et al. Trading Structure for Randomness in Wireless Opportunistic Routing. In : SIGCOMM'07, Aug. 27-31, 2007, Kyoto, Japan. ACM 978-1-59593-713-1/07/0008. http://nms.csail.mit.edu/~dina/pub/MORE.pdf. Last accessed May 9, 2008, 12 pages.

Chandra, et al. Multinet: Connecting to Multiple IEEE 802.11 Networks Using a Single Wireless Card. http://research.microsoft.com/~ranveer/docs/multinet_infocom.pdf. Last accessed May 9, 2008, 12 pages.

Cole, et al. Voice over IP Performance Monitoring. In : ACM SIGCOMM, Computer Communication Review. http://delivery.acm.org/10.1145/510000/505669/p9-cole.pdf?key1=505669 &key2=9287320121&coll=GUIDE&dl=GUIDE &CFID=67074094&CFTOKEN=30509074. Last accessed Jul. 3, 2008, 16 pages.

De Couto, et al. A High-Throughput Path Metric for Multi-Hop Wireless Routing. In : MobiCom '03, Sep. 14-19, 2003, San Diego, California, USA. ACM 1581137532/03/0009. http://pdos.csail.mit.edu/papers/grid:mobicom03/paper.pdf. Last accessed May 9, 2008, 13 pages.

Dai, et al. A Comparative Study of the Effects of Microdiversity and Macrodiversity on Cdma Forward-Link Capacity. 0-7803-7400-2/02 IEEE. http://ieeexplore.ieee.org/iel5/7828/21516/00997177.pdf?arnumber=997177. Last accessed May 9, 2008, 5 pages.

Eriksson, et al. Cabernet: A Content-Delivery Network for Moving Vehicles. In : MIT-CSAIL-TR-2008-003, Jan. 17, 2008. http://dspace.mit.edu/bitstream/1721.1/40094/1/MIT-CSAIL-TR-2008-003.pdf. Last accessed May 9, 2008, 16 pages.

Fon. http://www.fon.com/. Last accessed May 9, 2008, 1 page.

Gass, et al. Measurements of In-Motion 802.11 Networking. In : Proceedings of the Seventh IEEE Workshop on Mobile Computing Systems & Applications (WMCSA'06). 0-7695-2439-7/06 IEEE. http://ieeexplore.ieee.org/iel5/11140/35655/01691716.pdf. Last accessed May 9, 2008, 6 pages.

Giordano, et al. Enhanced DHCP Client. In : CHANTS'07, Sep. 14, 2007, Montréal, Québec, Canada. ACM 978-1-59593-737-07/07/0009. http://chants.cs.ucsb.edu/2007/papers/demo-1.pdf. Last accessed May 9, 2008, 2 pages.

Hadaller, et al. Vehicular Opportunistic Communication under the Microscope. In : MobiSys'07, Jun. 11-13, 2007, San Juan, Puerto Rico, USA. ACM 978-1-59593-614-1/07/0006. http://blizzard.cs.uwaterloo.ca/keshav/home/Papers/data/07/microscope.pdf. Last accessed May 9, 2008, 14 pages.

Shin, et al. Improving the Latency of 802.11 Hand-offs Using Neighbor Graphs. In : MobiSys'04, Jun. 6-9, 2004, Boston, Massachusetts, USA. ACM 1-58113-793-1/04/0006. http://www.cs.umd.edu/~waa/pubs/mobisys-2004.pdf. Last accessed May 9, 2008, 14 pages.

Johnson, et al. DSR: The Dynamic Source Routing Protocol for Multihop Wireless Ad Hoc Networks. http://www.monarch.cs.rice.edu/monarch-papers/dsr-chapter00.pdf. Last accessed May 9, 2008, 25 pages.

Leung, et al. A Wireless Local Area Network Employing Distributed Radio Bridges. In : Wireless Networks 2 (1996) 97-107. http://citeseer.ist.psu.edu/cache/papers/cs/22738/http:zSzzSzwww.ece.ubc.caZSz~vleungzSzjournal_paperszSzWINETzSzleung96.pdf/leung95wireless.pdf. Last accessed May 9, 2008, 11 pages.

Mahajan, et al. Understanding Wifi-Based Connectivity from Moving Vehicles. In : IMC'07, Oct. 24-26, 2007, San Diego, California, USA. ACM 978-1-59593-908-1/07/0010. http://www.imconf.net/imc-2007/papers/imc18.pdf. Last accessed May 9, 2008, 6 pages.

Miu, et al. Divert: Fine-Grained Path Selection for Wireless Lans. MobiSYS'04, Jun. 6-9, 2004, Boston, Massachusetts, USA. ACM 1-58113-793-1/04/0006. http://citeseer.ist.psu.edu/cache/papers/cs/32822/http:zSzSznms.lcs.mit.eduzSzpaperszSzdivert_mobisys04.pdf/miu04divert.pdf. Last accessed May 9, 2008, 14 pages.

Miu, et al. Improving Loss Resilience with Multi-Radio Diversity in Wireless Networks. In : MobiCom'05, Aug.28-Sep. 2, 2005, Cologne, Germany. ACM 1-59593-020-5/05/0008. http://nms.lcs.mit.edu/papers/mrd-mobicom-05.pdf. Last accessed May 9, 2008, 15 pages.

Moon, et al. Estimation and Removal of Clock Skew From Network Delay Measurements. 0-7803-5420-6/99 IEEE http://an.kaist.ac.kr~sbmoon/paper/intl-conf/1999-infocom-clock.pdf. Last accessed May 9, 2008, 8 pages.

Navda, et al. Mobisteer: Using Directional Antenna Beam Steering to Improve Performance of Vehicular Internet Access. In : MobiSys'07, Jun. 11-14, 2007, San Juan, Puerto Rico, USA. ACM 978-1-59593-614-1/07/0006. www.wings.cs.sunysb.edu/pubs/mobisteer.pdf. Last accessed May 9, 2008, 14 pages.

Ott, et al. Drive-Thru Internet: IEEE 802.11b for Automobile Users. 0-7803-8356-7/04 IEEE. IEEE INFOCOM 2004 http://www.ieee-infocom.org/2004/Papers/08_5.PDF. Last accessed May 9, 2008, 12 pages.

Perkinks. Mobile IP. IEEE Communications Magazine. 0163-6804/97 IEEE. IEEE Communications Magazine, May 1997. http://ieeexplore.ieee.org/iel1/35/12987/00592101.pdf. Last accessed May 9, 2008, 12 pages.

Ramani, et al. Syncscan: Practical Fast Handoff for 802.11 Infrastructure Networks http://www.cs.ucsd.edu/~iramani/sync_scan.pdf. Last accessed May 9, 2008, 10 pages.

Reardon. Switching from Cell to Wi-Fi, Seamlessly. Published: Sep. 7, 2006 http://www.news.com/Switching-from-cell-to-Wi-Fi,-seamlessly/2100-1039 3-6113223.html. Last accessed May 9, 2008, 4 pages.

Rodriguez, et al. Mar: A Commuter Router Infrastructure for the Mobile Internet. http://citeseer.ist.psu.edu/cache/papers/cs/31015/http:zSzzSzwww.cl.cam.ac.ukzSzResearchzSzSRGzSznetoszSzpaerszSzcomob-webzSz2004-mobisys.pdf/rodriguez04mar.pdf. Last accessed May 9, 2008, 14 pages.

Seshan, et al. Handoffs in Cellular Wireless Networks: The Daedalus Implementation and Experience. In : Kluwer International Journal on Wireless Communication Systems, 1996. http://citeseer.ist.psu.edu/cache/papers/cs/3471/http:zSzSzdaedalus.cs.berkeley.eduzSzpublicationszSzkluwer.pdf/handoffs-in-cellular-wireless.pdf. Last accessed May 9, 2008, 18 pages.

Snoeren, et al. Fine-Grained Failover Using Connection Migration http://nms.lcs.mit.edu/papers/migrate-failover.pdf. Last accessed May 9, 2008, 12 pages.

Thompson, et al. Flow Scheduling for End-Host multihoming http://swing.cs.uiuc.edu/papers/INFOCOM06PERM.pdf. Last accessed May 9, 2008, 12 pages.

Viterbi, et al. Soft Handoff Extends CDMA Cell Coverage and Increases Reverse Cell Capacity. In : IEEE Journal on Selected Areas in Communications, vol. 12, No. 8, Oct. 1994. 0733-8716/94 IEEE. http://ieeexplore.ieee.org/iel1/49/7789/00329346.pdf. Last accessed May 9, 2008, 8 pages.

City-Wide Wi-Fi Rolls Out in UK. Last Updated: Tuesday, Jan. 3, 2006. http://news.bbc.co.uk/2/hi/technology/4578114.stm. Last accessed May 9, 2008, 2 pages.

Grebb. Cities Unleash Free Wi-Fi. Published Oct. 19, 2005. http://www.wired.com/gadgets/wireless/news/2005/10/68999. Last accessed May 9, 2008, 1 page.

Kandula, et al. FatVAP: Aggregating AP Backhaul Capacity to Maximize Throughput. In: 5th USENIX Symposium on Networked Systems Design and Implementation, San Francisco, CA, Apr. 2008. http://nms.lcs.mit.edu/papers/kandula_fatvap_nsdi08.pdf. Last accessed Jul. 3, 2008, 15 pages.

* cited by examiner

INTERACTIVE WIFI CONNECTIVITY FOR MOVING VEHICLES

BACKGROUND

Internet access on-board moving vehicles is in demand as mobility has become part of the daily experience. Cheap and high-quality Internet access from moving vehicles to stay connected while traveling is increasingly desirable among Internet users. Cellular networks can provide such connectivity with current practices, but they tend to be expensive. At the same time, there is an increasingly ubiquitous deployment of inexpensive 802.11-based (WiFi) networks, and in many cases, entire cities are being covered.

The ubiquity of WiFi deployments, with existing practices, can possibly support common applications, such as Web browsing, instant messaging, and voice over IP (VoIP), from moving vehicle. Current development efforts have focused on connectivity from vehicles to open-access base-stations rather than continuous connectivity across a series of base-stations. Other practices also propose application specific techniques or new applications that may work well in such environments. Current practices consider a number of operations and features including using multiple base-stations (BSes), opportunistic routing in static mesh networks, network access from moving vehicles, and fast handoffs.

Regarding the use of multiple BSes, multiple BSes can act in concert to improve client performance. Such methods exist in the domain of both cellular and WiFi communication. The cellular methods, however, require tight integration with the physical layer and strict timing across BSes. Additionally, these abilities can require expensive BS hardware which is not suitable for commodity wireless deployments. In the WiFi context, various techniques including Distributed Radio Bridges, Divert, and MRD use multiple BSes as well, to improve client performance in enterprise WLAN deployments. The BS coordination mechanism in these systems assumes that a high-capacity LAN is available. For instance, in MRD, BSes can coordinate by sending received frames to a central controller that is responsible for forwarding a copy to the Internet. Thus, if clients typically reach three BSes, the required LAN capacity is at least three times the cumulative sending rate of all clients.

Also, MultiNet, FatVAP, and PERM techniques enable clients to associate with more than one nearby BS, for instance, to increase throughput if the wireless capacity is greater than the capacity of individual wired links behind the BSes. These systems, however, do not focus on improving connectivity of the client-BS communication.

In the context of opportunistic routing (OR), OR can deploy one o more protocols such as ExOR and MORE to operatively leverage opportunistic receipt of packets with low coordination overhead. This approach considers batching wireless communication data packets to amortize overhead across the batch. Batching, however, is unsuitable for most interactive uses. For instance, voice over Internet protocol (VoIP) cannot afford the delay associated with waiting for the packets communicated by such protocols. For short transfer control protocol (TCP) transfers, the sender's congestion window will frequently be smaller than the batch size. Also, even for large data transfers, batching may interact poorly with TCP's rate control.

Furthermore, current developments to improve WiFi performance for vehicular access is generally based on controlled settings, with near line-of-sight connectivity and little interference. Recent work has shown that connectivity between individual BSes and vehicular clients is often interrupted by gray periods. Current practices consider transferring data using TCP through individual BSes as the vehicle drives by them, without maintaining connections across each of the BSes. However, performance in this setting is severely hindered by overheads at several layers, such as dynamic host control protocol (DHCP) and aggressive TCP backoffs due to losses. Current practices also consider equipping vehicles with directional antennae to improve the performance of the communications link. While directional antennae extend reach, they do not prevent connectivity disruptions that can occur even close to BSes.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein provides for systems and methods that enable high-performance Internet access on board moving vehicles using WiFi data communication protocols. In an illustrative implementation, an exemplary wireless data communications environment comprises a ViFi module, an instruction set comprising at least one instruction set to process data for wireless communication between a cooperating component onboard a moving vehicle and other cooperating wireless components, and one or more wide-area wireless communications links.

In an illustrative operation, the ViFi module can perform one more wireless communications techniques to exploit macro-diversity and opportunistic receptions by cooperating WiFi base stations to minimize disruptions for mobile clients. In the illustrative operation, the exemplary ViFi module can communicate data to and from one or more cooperating WiFI base stations such that the one or more base stations can operatively opportunistically overhear a packet, and can probabilistically relay the packet to the intended next hop, such that wasted transmissions are minimized without requiring batching operations and without tasking an exemplary backplane of a wireless communications environment.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
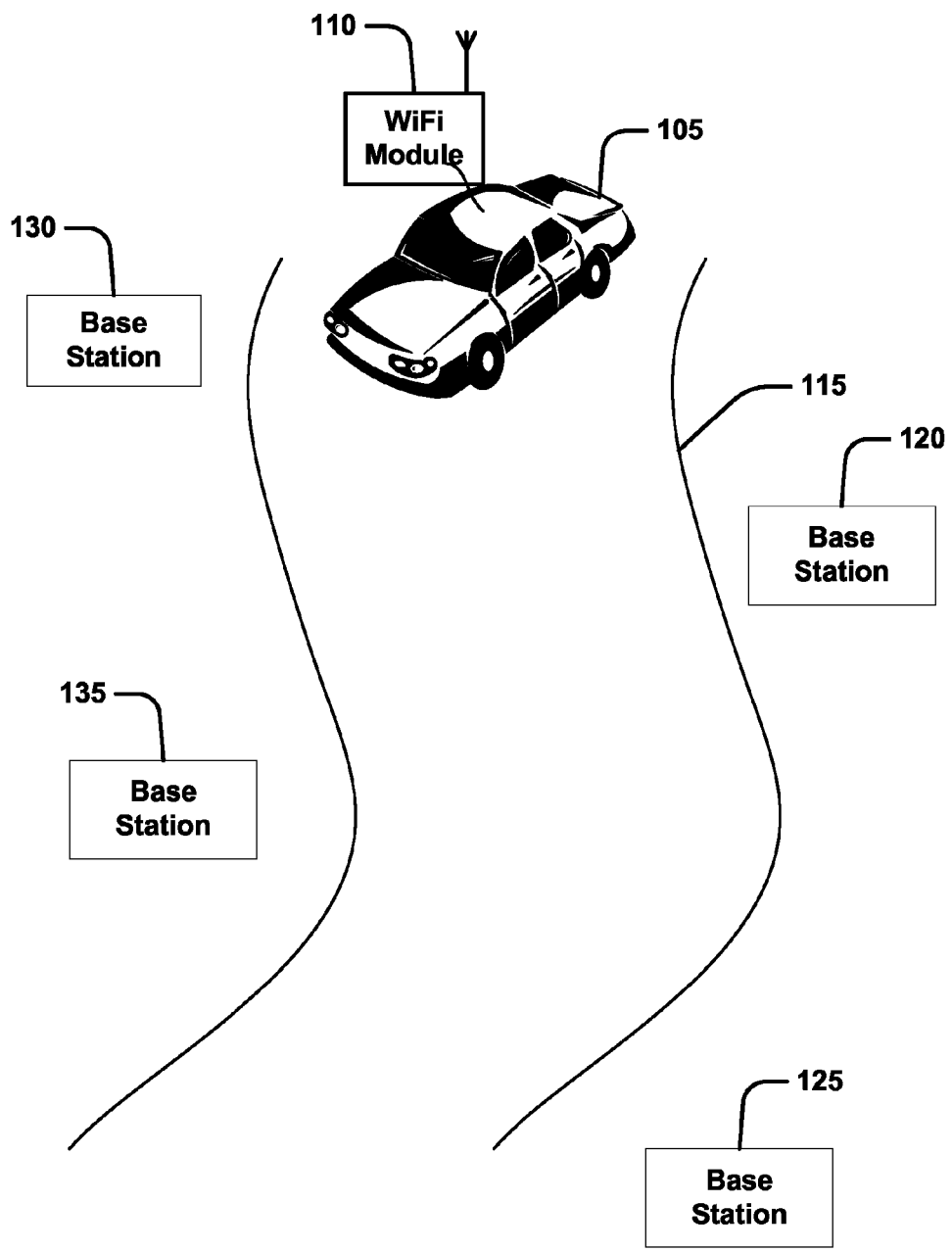
FIG. 1 is a block diagram of one example of an illustrative wireless communications environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

ViFi Overview:

The herein described systems and methods comprise a ViFI module operative to perform a selected communications protocol which promotes efficiency and reduces disruption in the communication of data from moving vehicles and cooperating WiFi access points (e.g., network of base stations). In an illustrative implementation, the selected communications protocol comprises a ViFi protocol. In an illustrative operation, the exemplary wireless communications environment can maintain one or more selected properties comprising: 1) diversity—a packet sent by a moving vehicle can often be heard by multiple BSes, and multiple BSes can often deliver packets to a moving vehicle; and 2) inter-BS communication—the BSes can communicate via a multi-hop wireless network (possibly on a different frequency than the one used for clients), a wired network, or a combination.

In an illustrative implementation, the exemplary ViFi module is operative to leverage opportunistic receptions by nearby BSes, followed by probabilistic relaying. Opportunistic receptions provide low-overhead data communications and probabilistic relaying avoids the need for explicit coordination messages between BSes. In the illustrative implementation, the ViFi module can be operative to perform one or more handoffs and perform salvaging, in which BSes can save packets that get stranded at BSes when the vehicle moves away.

In an illustrative implementation, in deploying the ViFi protocol, the vehicle can designate one of the nearby BSes as the anchor. The anchor can be selected using any of the association methods that clients use with current practices to pick a BS. The anchor is responsible for the vehicle's connection to the Internet-packets from the vehicle are forwarded through the anchor and packets from the Internet destined for the vehicle first arrive at the anchor. A client acquires its IP address from the anchor BS, if needed. In the illustrative implementation, the vehicle can designate other nearby BSes as auxiliary (e.g., BSes that the vehicle hears as auxiliaries). In highly dense environments, the list of auxiliaries can be limited to include a selected number of configured number. The vehicle can operatively embed the identity of the current anchor and the auxiliaries in its beacons that it broadcasts periodically. Beacons enable proximate BSes to learn the current anchor and the set of auxiliary BSes. Changes to the identity of the anchor or the set of auxiliary BSes can also be communicated to the BSes at the beaconing frequency. The vehicle also embeds the identity of the previous anchor for salvaging.

The operation of an exemplary ViFi module can be symmetric in both directions and is illustratively described by the exemplary terms: the source, src, and destination, dst, of the transfer. In an illustrative implementation, in the upstream direction, the vehicle can be the source and the anchor can be the destination. The roles can be reversed in the downstream direction.

1. src transmits the packet P.
2. If dst receives P, it broadcasts ACK.
3. If an auxiliary overhears P from src but not ACK, it probabilistically relays P to the destination.
4. If dst receives relayed P and has not already sent an ACK, it broadcasts ACK.
5. If src does not receive ACK within the retransmission interval, it retransmits P.

Upstream packets can be relayed on the inter-BS backplane and downstream packets on the vehicle-BS channel. A packet can be considered for relaying a selected number of times (e.g., only once) and packets overheard from other auxiliary BSes are not relayed. Relaying by an auxiliary BS can better than a retransmission by the source itself since the losses are bursty—if the original was lost, there is a high chance that an immediate retransmission will be lost as well. After a loss, other nodes can be positioned to deliver the packet to the destination. Additionally, when relaying in the upstream direction the inter-BS communication plane can be utilized, which in many cases will be more reliable than the vehicle-BS channel.

In an illustrative operation, the relaying probability computation by an exemplary ViFi module can be based on one or more selected parameters including but not limited to: BSes relay when the destination did not hear the packet, with high probability; the total number of relayed packets is low; BSes that are more likely to succeed at delivering the packet to destination are preferred that other BSes; packet coordination per packet can be performed. In the illustrative operation, relaying probabilities can be processed according to one or more of these parameters.

An exemplary ViFi module can be deployed such that an auxiliary BS can operatively compute its relaying probability so that, collectively, the expected number of packets relayed is a selected number of packets (e.g., one). In an illustrative operation, the relay probability computation in ViFi from the perspective of an individual BS, say, $B_x$ can be performed. In the illustrative implementation, $B_x$ can compute the relaying probability in the instance that the BS heard a communicated packet but not an acknowledgment between a destination and a source. For example, if $B_1, \ldots, B_k$ can be described to be the set of auxiliary BSes, including $B_x$, and node s be described as the source of the packet and node d be described as the destination, where a node is a vehicle or anchor BS depending on the direction of the packet. In the illustrative implementation, $c_i$ can be considered to be the probability that $B_i$ received the original packet but not the acknowledgment. As such, $c_i$ can represent the probability that $B_i$ is contending to relay the packet.

Illustratively, $B_x$ can compute $c_i$ for BS $B_i$ according to the exemplary equation:

$$c_i = p_{si} \cdot ((1-p_{sd}) + p_{sd}(1-p_{di}))$$

where $p_{ab}$ represents the probability that b correctly receives a transmission from a. Thus, $p_{si}$ can be the probability that $B_i$ received the original packet. The second term in the exemplary product can be illustratively be considered the probability that $B_i$ did not hear the acknowledgment, which can happen if the destination node d did not hear the packet $(1-p_{sd})$ or if the destination node d heard the packet but $B_i$ did not hear the acknowledgment $(p_{sd}(1-p_{di}))$.

In the illustrative implementation, $r_i$ can be considered the probability with which $B_i$ relays the packet such tha.

$$\sum_{i=1} r_i c_i = 1$$

Illustratively, the above constraint equation can be considered to be an under-constrained system (e.g., as represented by the above equation) with one constraint and k variables $(r_1 \ldots r)$. Illustratively, $r_i$ can be weighted based on the probability that a relayed packet will reach the intended destination. That is, $B_x$ can operatively set $r_i = r \cdot p_{id}$ for values of i. The $r_i$ equation can then be solved by $B_x$ uniquely for r and can relay the packet with probability $r \cdot p_{xd}$.

In the downstream direction, $p_{id}$ can be considered the probability that the vehicle will hear the packet from $B_i$. In the upstream direction, the anchor BS can be the destination, and we use $p_{id} = 1$. Alternatively, $r_i$ can be weighted based on the cost of routing from $B_i$ to the anchor, for instance, when the inter-BS backplane uses a multi-hop mesh routing protocol. $B_x$ can illustratively compute its own $c_x$, given that the base station is contending for the data communication packets. This allows other BSes, which do not possess this knowledge, to make consistent decisions.

If the BSes have consistent reception probability estimates, they would arrive at consistent relaying probabilities for each other and the expected number of relayed packets would be predictable (e.g., 1).

Sometimes a vehicle moves out of range before the anchor BS can deliver packets from the Internet. Application performance, especially that of TCP, can suffer if such groups of back-to-back packets are lost frequently. To avoid this problem in ViFi, newly designated anchors salvage packets by contacting the previous anchor over the backplane. The new anchor learns the identity of the previous anchor from the beacons. Upon contact, the old anchor transfers any unacknowledged packets that were received from the Internet within a certain time threshold. Illustratively, the new anchor treats these packets as if they arrived directly from the Internet.

In the current 802.11 standard, acknowledgments are sent immediately after packet transmission, so the source knows when to retransmit an unacknowledged packet. But acknowledgments in ViFi may be delayed if they are generated in response to a relayed packet. The delay depends on the time for relayed packets to reach the destination, and thus retransmission timers must be set based on current network conditions.

Illustratively, the ViFi source sets the retransmit timer adaptively based on the observed delays in receiving acknowledgments. The source keeps track of the delays in receiving acknowledgments for its transmissions. Each packet can carry a unique identifier so that acknowledgments are not confused with an earlier transmission. The source can then pick as the minimum retransmission time a selected percentile of measured delays. Transmission opportunities can arise for the source before the retransmission time for the earliest packet in the queue elapses. In such an event, instead of leaving the medium idle, the source can send the earliest queued packet that is ready for transmission. This can cause some amount of reordering when a later packet reaches the destination first. The reordering can be corrected easily if required using a sequencing buffer.

Wireless Communication Channel Improvement:

FIG. 1 shows an exemplary wireless communications environment 100 for use to enable Internet access on vehicles. As is shown in FIG. 1, wireless communications environment 100 comprises vehicle 105, WiFi module 110, roadway 114, and base stations 120, 125, 130, and 135. In an illustrative implementation, the WiFi module 110 can wirelessly cooperate with one or more base stations 120, 125, 130, and 135 to wireless communicate data packets to and/or from the WiFi module 110 to the one or more cooperating base stations 120, 125, 130, and 135, respectively. In an illustrative operation, WiFi module 110 can deploy one or more communications protocols including a ViFi communication protocol operative to perform one or more probabilistic relaying operations when communicating data to/from the WiFi module 110 to the one or more base stations 120, 125, 130, and 135.

Figure 2:
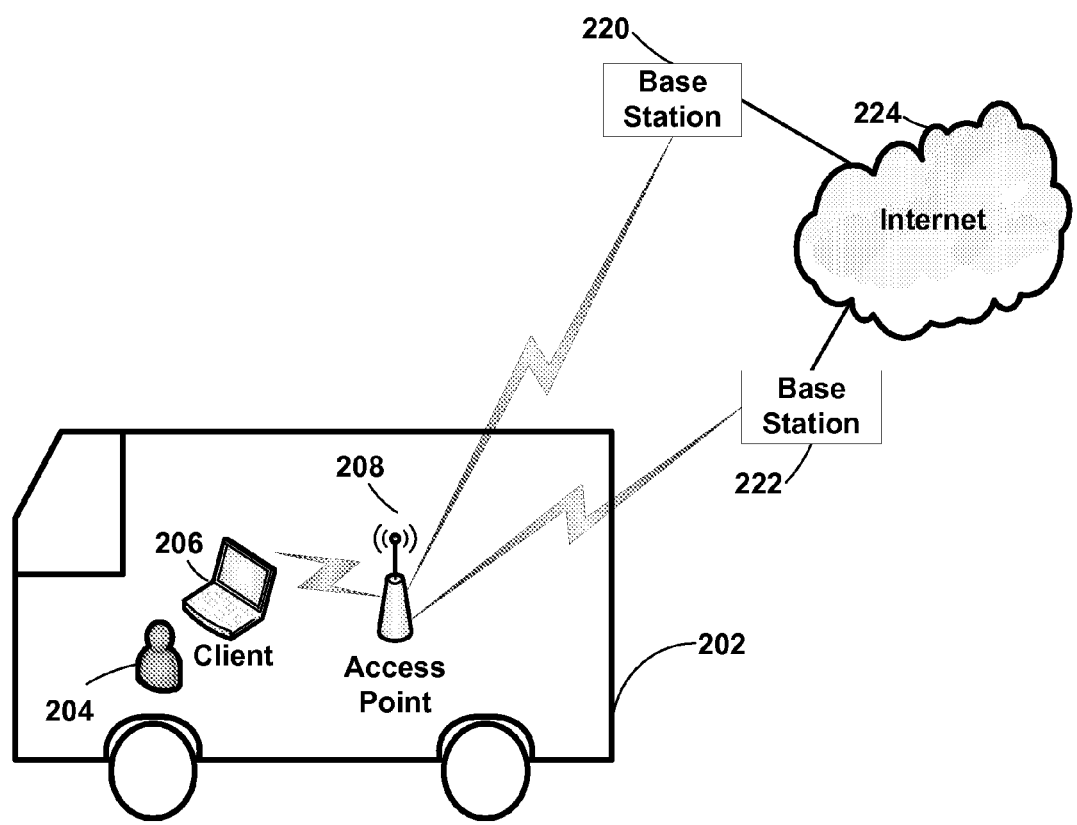
FIG. 2 is a block diagram of one example of an illustrative wireless communications environment in accordance with the herein described systems and methods.

FIG. 2 shows an exemplary wireless communications environment 200 for use to enable Internet access on vehicles. As is shown in FIG. 2, exemplary wireless communications environment 200 comprises vehicle 202, user 204, client 206, access point 208, the Internet 224, base station 220, and base station 222. In an illustrative implementation, user 204 can cooperate with client computing environment 206 to communicate data to the Internet 224, via access point 208. As is shown in FIG. 2, access point 208 can wireless cooperate with base station 220 and 222, respectively, to communicate data to/from client computing environment 206 to Internet 224. In an illustrative operation, access point can deploy one or more communications protocols including a ViFi communication protocol operative to perform one or more probabilistic relaying operations when communicating data to/from client computing environment 206 to Internet 224 through base stations 220 and 222. In the illustrative implementation, an exemplary ViFi module locatable on both access point 208 and base station 220 and 222, respectively, can be operable to communicate data using the exemplary ViFi communication protocol.

Figure 3:
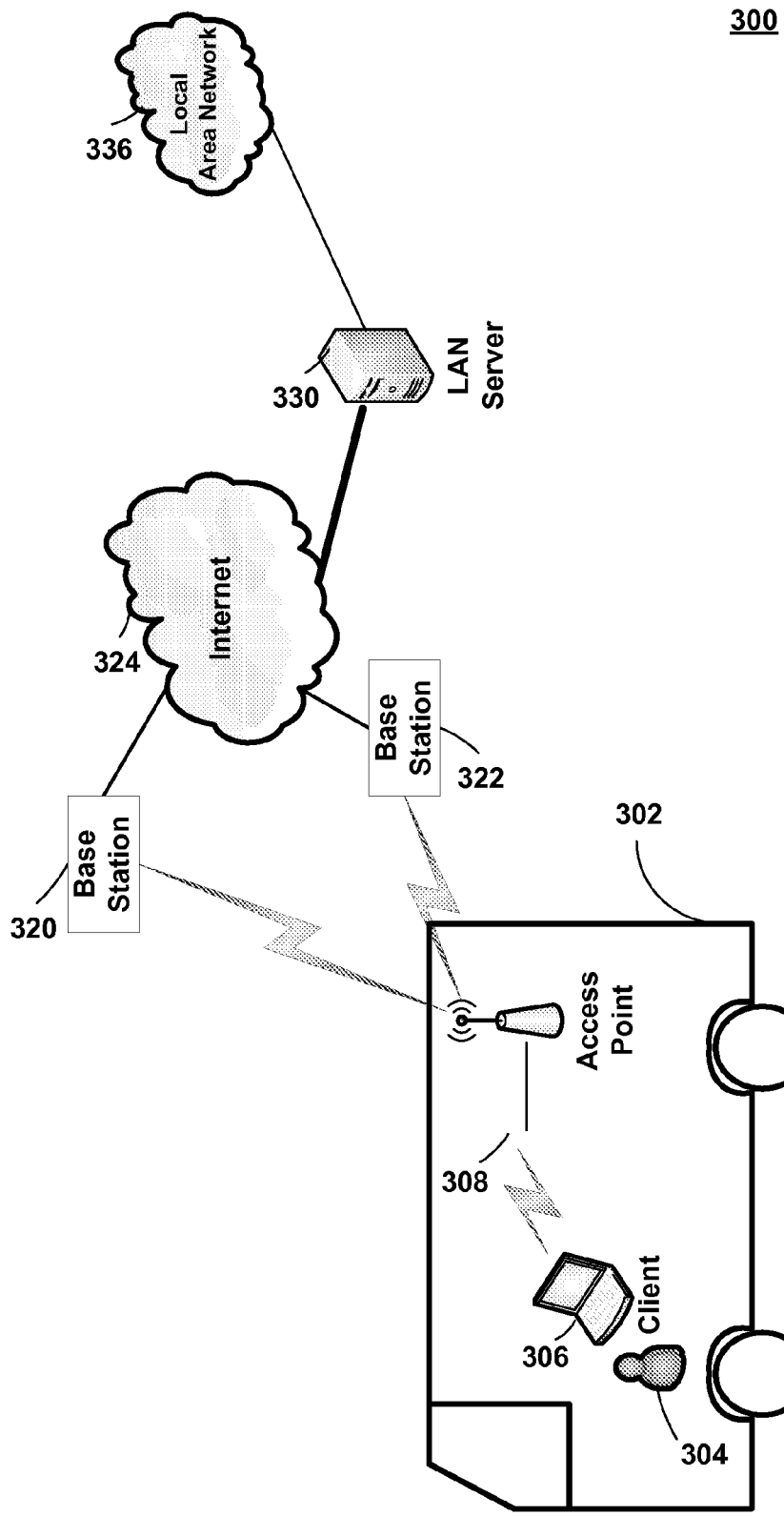
FIG. 3 is a block diagram of the interaction of exemplary components of an illustrative wireless communications environment in accordance with the herein described systems and methods.

FIG. 3 shows exemplary wireless communications environment 300. As is shown in FIG. 3, wireless communications environment 300 comprises vehicle 302, base stations 320 and 322, the Internet 324, LAN server 330, and local area network 336. Further, as is shown vehicle 302 comprises user 304, client computing environment 306, wireless access point (AP) 308. In an illustrative operation, a user 304 can interface with client computing environment 306 to wirelessly transmit and/or receive data with cooperating access point 308. Such transmitted data can then be processed by base stations 320 and 322 for communication over Internet 324 to LAN server 330 and from LAN server 330 to local area network 336. In an illustrative operation, access point 308 can deploy one or more communications protocols including a ViFi communication protocol operative to perform one or more probabilistic relaying operations when communicating data to/from client computing environment 306 to Internet 324 through base stations 320 and 322. In the illustrative implementation, an exemplary ViFi module locatable on both access point 308 and base station 320 and 322, respectively, can be operable to communicate data using the exemplary ViFi communication protocol.

Figure 4:
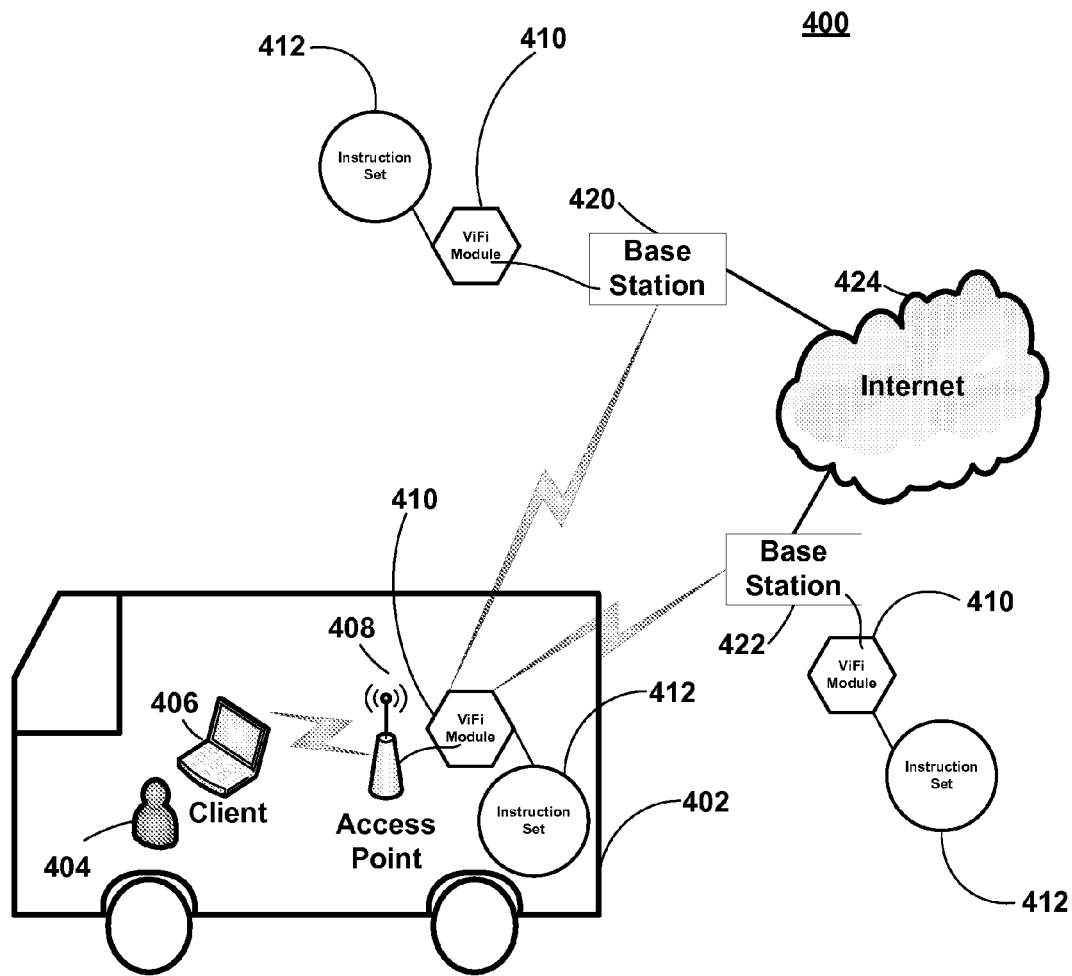
FIG. 4 is a block diagram of the interaction of exemplary components of an illustrative wireless communications environment deploying a ViFi communications protocol in accordance with the herein described systems and methods.

FIG. 4 shows exemplary wireless communications environment 400. As is shown in FIG. 4, wireless communications environment 400 comprises vehicle 402, base stations 420 and 422, the Internet 424. Further, as is shown vehicle 402 comprises user 404, client computing environment 406, wireless access point (AP) 408, ViFi module 410 and instruction set 412. In an illustrative operation, a user 404 can interface with client computing environment 406 to wirelessly transmit and/or receive data with cooperating access point 408 which electronically cooperates with ViFi module 410 according to one or more instructions provided by instruction set 412. In the illustrative implementation, and as is shown in FIG. 4, exemplary ViFi module 410 locatable on both access point 408 and base station 420 and 422, respectively, can be operable to communicate data using the exemplary ViFi communication protocol. Such transmitted data can then be processed by corresponding ViFI module 410 operable and locatable on base stations 420 and 422 for communication over Internet 424. In an illustrative operation, access point 408 can deploy one or more communications protocols including a ViFi communication protocol operative to perform one or more probabilistic relaying operations when communicating data to/from client computing environment 406 to Internet 424 through base stations 420 and 422.

In the illustrative implementation ViFi module 410 can comprise a computing application operative to cooperate with one or more base stations 420 and 422 to instruct the one or more base stations 420 and 422 to perform probabilistic relaying for data packets being communicated to/from access point 408 to/from Internet 424 such that the probabilistic relaying is executed according to a selected data communications paradigm. In an illustrative operation, the selected data communications paradigm can comprise one or more acts comprising: communicating data packets from a source (e.g., access point 410) to a destination (e.g., base station 420) and allowing other cooperating base stations (e.g., base station 422—i.e., auxiliary base station) to overhear the data communications between the exemplary source and destination and perform relaying of data packets by an auxiliary base station from the source and destination when one or more conditions are satisfied including but not limited to in the event that the destination does not provide acknowledgement back to the source for the communicated data packet.

Figure 5:
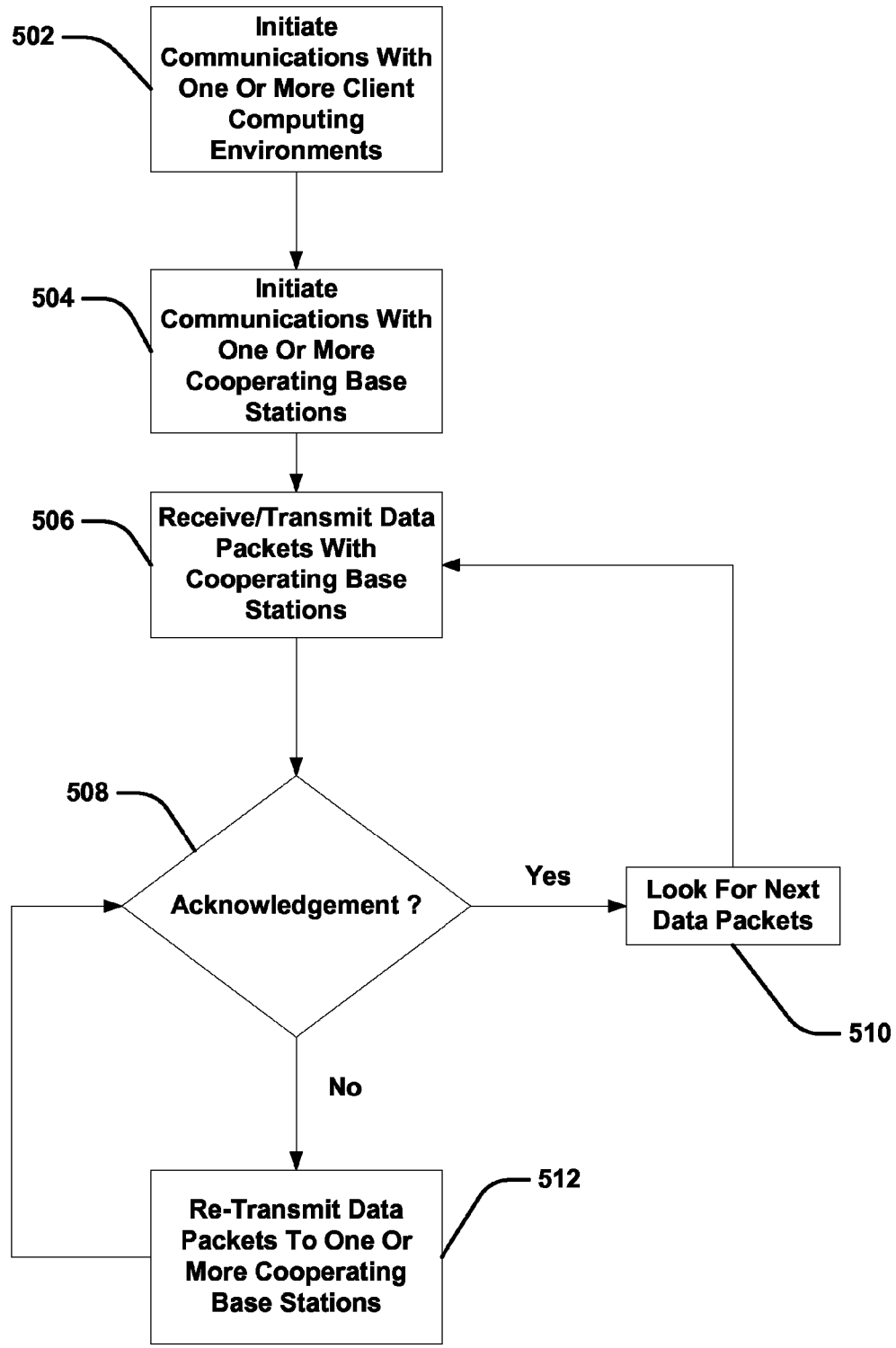
FIG. 5 is a flow diagram of an exemplary method for communicating data across one or more wireless communications base stations in accordance with the herein described systems and methods.

FIG. 5 is a flow diagram of one example of a method 500 performed when wirelessly communicating data from a moving vehicle to cooperating WiFi communications components. As is shown, processing begins at block 502 where communications are initiated with one or more client computing environments. Processing then proceeds to block 504 where communications are initiated with one or more cooperating base stations. Data packets for transmission to the one or more cooperating base stations are received at block 506. A check is then performed to determine if an acknowledgement has been received from an exemplary destination (e.g., a component to which the received data packets are being transmitted).

If the check at block 508 indicates that an acknowledgement has been received processing proceeds to block 510 where the next set of data packets are looked for. Processing then reverts to block 506 and continues from there. However, if the check at block 508 indicates that an acknowledgement has not been received, processing proceeds to block 512 where the data packets are re-transmitted to the one or more cooperating base stations.

Figure 6:
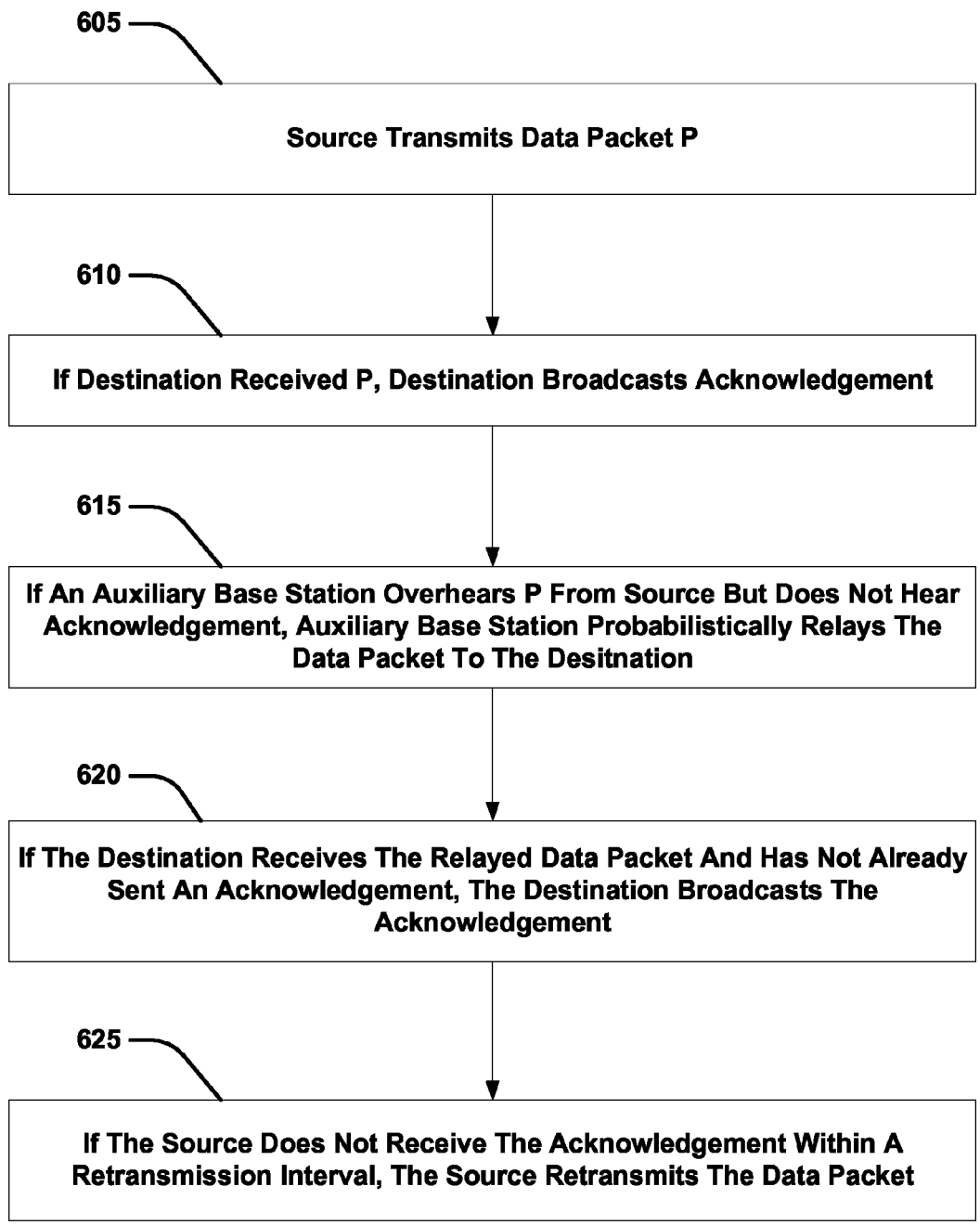
FIG. 6 is a flow diagram of an exemplary method for communicating data deploying probabilistic relaying in a macrodiversity coding and minimum path delay in accordance with the herein described systems and methods.

FIG. 6 is a flow diagram of one example of a method 600 performed to wirelessly communicate data from a moving vehicle to one or more cooperating components of an exemplary wireless communications environment (e.g., 400 of FIG. 4). As is shown, processing begins at block 605 where a source transmits data packet P to a cooperating destination. At block 610 a check is performed to determine if the destination received data packet P and if the check is positive, the destination broadcasts an acknowledgement. Processing then proceeds to block 615 where an auxiliary base station can overhear the communication of P from the source but does not hear an acknowledgement from the destination to the source, the auxiliary base station can probabilistically relay the data packet P to the destination (e.g., according to a selected communications protocol such as ViFi). From there, processing proceeds to block 620 where if the destination receives the relayed data packet and has not sent an acknowledgement, the destination broadcasts an acknowledgement. Processing then proceeds to block 625 where if the source does not receive the acknowledgement from the destination within a selected retransmission interval, the source retransmits the data packet to the destination.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
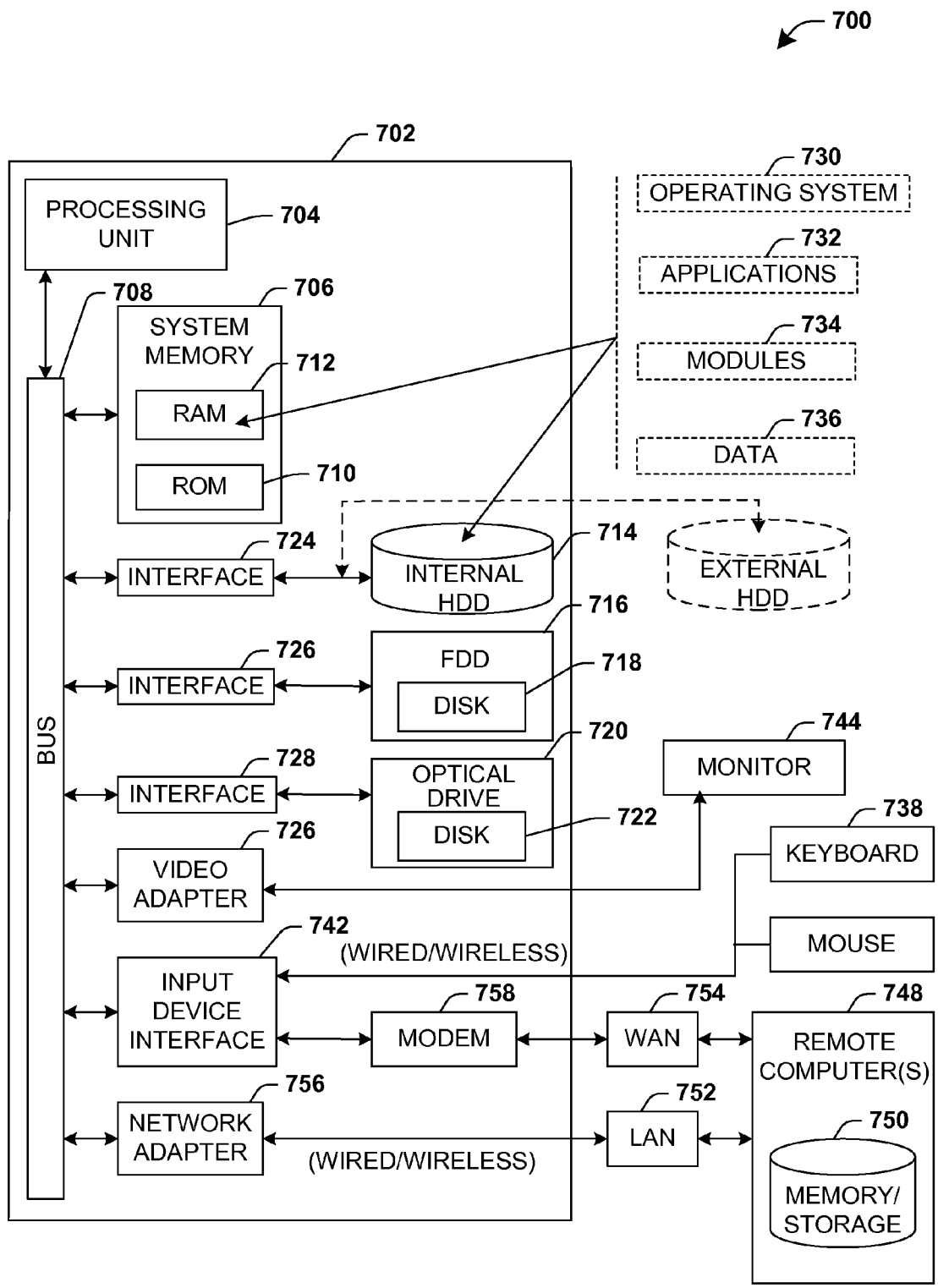
FIG. 7 is a block diagram of an exemplary computing environment.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 8:
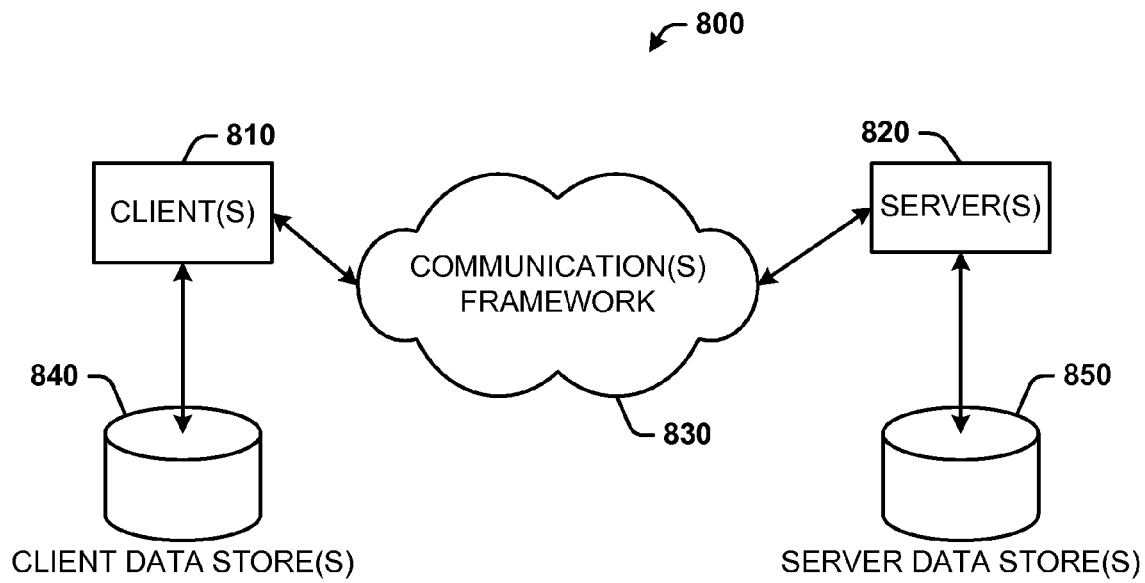
FIG. 8 is a block diagram of an exemplary networked computing environment.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system allowing for the wireless communication of data between one or more cooperating components on-board a vehicle and a wireless communications environment comprising:
    a ViFi module operative to process data for wireless communication between the one or more components on board the vehicle and one or more components of the wireless communication environment; and
    an instruction set comprising at least one instruction instructing the ViFi module to process data according to a selected wireless relaying data communication paradigm,
    wherein the selected wireless relaying data communication paradigm comprises one or more properties including performing probabilistic relaying by one or more components of the wireless communication environment, an auxiliary component of the wireless communications environment relaying a data packet to a destination component of the wireless communications environment in response to the auxiliary component of the wireless communication environment overhearing the data packet but not hearing an acknowledgement for the data packet from the destination component.

2. The system as recited in claim 1, wherein the ViFi module is operative to provide one or more instructions to the one or more components of the wireless communications environment to perform one or more probabilistic relaying operations.

3. The system as recited in claim 2, wherein the probabilistic relaying operations comprise monitoring the communication of data packets originating from source component of the wireless communications environment and to be delivered to the destination component to determine if the data packets are successfully communicated.

4. The system as recited in claim 3, wherein the one or more selected data conditions comprise successfully receiving an acknowledgement by the source component of the wireless communications environment.

5. The system as recited in claim 3, wherein the source component of the wireless communications environment comprises any of a client computing environment on a vehicle and a base station.

6. The system as recited in claim 3, wherein the destination component of the wireless communications environment comprises any of a client computing environment on a vehicle and a base station.

7. The system as recited in claim 1, wherein the ViFi module comprise a computing environment.

8. The system as recited in claim 1, further comprising a client computing environment operable to communicate with the one or more components of the wireless communications environment.

9. The system as recited in claim 8, further comprising an access point operable to communicate data between the client computing environment and the one or more components of the wireless communications environment.

10. The system as recited in claim 1, wherein the client computing environment comprises a portion of the vehicle.

11. A method to facilitate data communications between an on-board vehicle and one or more components of a wireless communications environment comprising:
    initiating communications between a source component of the wireless communications environment and a destination component of the wireless communications environment;
    listening by a non-destination component of the wireless communications environment for a data packet and an acknowledgment being communicated between the source component of the wireless communications environment and the destination component of the wireless communications environment;
    receiving data for communication between the source component of the wireless communications environment and the destination component of the wireless communications environment; and
    performing one or more probabilistic relaying operations on the received communicated data, including relaying, by the non-destination component of the wireless communications environment, the received communicated data to the destination component of the wireless communications environment based at least in part on whether the non-destination component of the wireless communication environment overhears the communicated data and the acknowledgement for the received communicated data from the destination component to the source component.

12. The method as recited in claim 11, further comprising initiating communications with a client computing environment.

13. The method as recited in claim 11, further comprising initiating communications with one or more base stations.

14. The method as recited in claim 11, further comprising relaying the data packet from the non-destination component of the wireless communications environment to the destination component of the wireless communications environment in the event that the destination component of the wireless communications environment does not provide an acknowledgement to the source component of the wireless communications environment.

15. The method as recited in claim 11, in which the acknowledgement is provided by the destination component of the wireless communications environment upon the receipt of the relayed data packet.

16. The method as recited in claim 15, further comprising receiving the acknowledgement by the source component of the wireless communications environment from the destination component of the wireless communications environment upon the receipt of the data packet comprising the non-relayed data packets and relayed data packet by the destination component of the wireless communications environment.

17. The method as recited in claim 11, further comprising retransmitting the data packet by the source component of the wireless communications environment in the event the acknowledgement is not received by the source component from the destination component within a selected retransmission time interval.

18. A non-transitory computer readable storage medium having computer executable instructions to instruct a computing environment to perform acts comprising:

initiating communications between a source component of the wireless communications environment and a destination component of the wireless communications environment;

overhearing by an auxiliary component of the wireless communications environment for a data packet and an acknowledgment being communicated between the source component of the wireless communications environment and the destination component of the wireless communications environment;

receiving data for communication between the source component of the wireless communications environment and the destination component of the wireless communications environment; and performing one or more probabilistic relaying operations on the received communicated data, including relaying, by the auxiliary component of the wireless communications environment, the received communicated data to the destination component of the wireless communications environment in response to the overhearing.

19. The non-transitory computer readable storage medium as recited in claim 18, in which the acknowledgement for the source component is provided by the destination component of the wireless communications environment upon the receipt of the relayed data packet by the destination component of the wireless communications environment.

20. The non-transitory computer readable storage medium as recited in claim 18, wherein the source component of the wireless communications environment retransmits the data packet in the event the acknowledgement is not received by the source component from the destination component within a selected retransmission time interval.

\* \* \* \* \*

UNITED STATES PATENT AND TRADEMARK OFFICE
CERTIFICATE OF CORRECTION

PATENT NO. : 8,457,546 B2
APPLICATION NO. : 12/178410
DATED : June 4, 2013
INVENTOR(S) : Mahajan et al.

It is certified that error appears in the above-identified patent and that said Letters Patent is hereby corrected as shown below:

In the Claims

Column 15, line 12, Claim 18 change "A non-transitory computer readable storage medium" to
--A tangible computer readable storage medium--

Column 16, line 11, Claim 19 change "The non-transitory computer readable storage medium" to
--The tangible computer readable storage medium--

Column 16, line 17, Claim 20 change "The non-transitory computer readable storage medium" to
--The tangible computer readable storage medium--

Signed and Sealed this
Twenty-ninth Day of October, 2013

Teresa Stanek Rea
*Deputy Director of the United States Patent and Trademark Office*